INVENTOR.
JAMES R. DAVIS
ATTORNEYS

Oct. 19, 1965 J. R. DAVIS 3,212,424

FLUID CONTROL DEVICE

Filed May 14, 1963 3 Sheets-Sheet 2

INVENTOR.
JAMES R. DAVIS
BY
*Holmes & Andersen*
ATTORNEYS

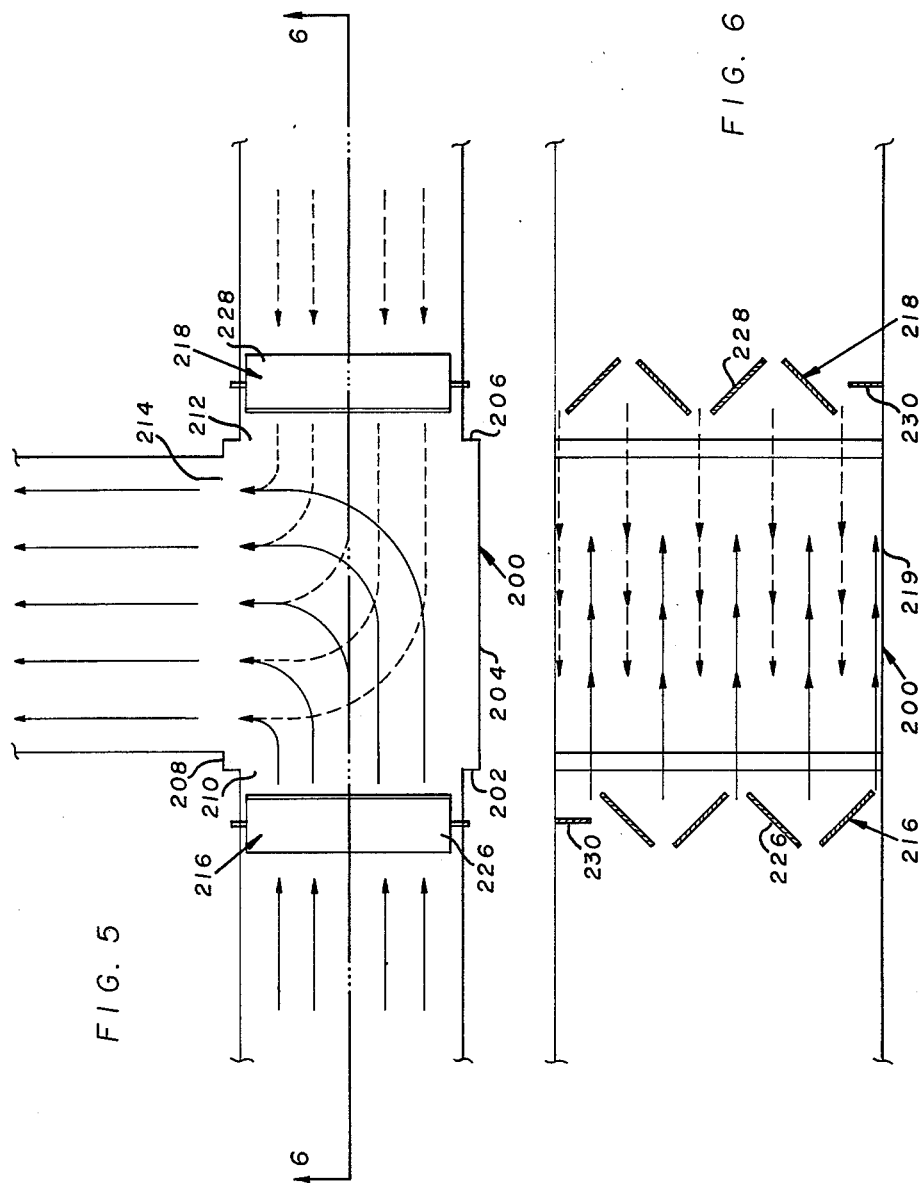

United States Patent Office 3,212,424
Patented Oct. 19, 1965

3,212,424
FLUID CONTROL DEVICE
James R. Davis, La Crosse, Wis., assignor to The Trane Company, La Crosse, Wis., a corporation of Wisconsin
Filed May 14, 1963, Ser. No. 280,334
13 Claims. (Cl. 98—38)

This invention relates to fluid distributing apparatus and more particularly to a fluid mixing and thermostatic responsive volume and temperature control device. In addition this invention relates to apparatus for the prevention of heat exchange coil freeze-up in certain heating and ventilating installations.

In heating and ventilating systems it is common practice to recirculate a portion of the air discharged from the conditioned space. This portion may be admixed with fresh or outside air prior to re-introduction into conditioned space. The temperature of this mixture of fresh and recirculated air may be raised prior to delivery to the conditioned space by passing the same through a heating coil supplied with hot water or steam. It will be obvious to those skilled in the art that it is desirable that the conditioned air be thoroughly mixed prior to entering the conditioned space for purposes of comfort, etc.

Furthermore, it is well known to those having skill in the art that thorough mixing of fresh and recirculated air prior to the delivery to the heat exchange coil is desirable to avoid freeze-up of the coil. Without thorough mixing, freezing outside air may impinge upon the coil and effect spot freezing of the exchange fluid therein. Thorough mixing of the outside or fresh air with recirculated air has been attempted by the use of mixing chambers which in actual practice do little more than coadunate the two air streams. It has been suggested that mixing baffles be provided for such chambers to effect sufficient mixing, at additional expense.

Thus it is an object of this invention to provide in an air conditioning system an improved air mixing means to thoroughly mix dissimilar streams of air prior to delivery to a heat exchange coil.

It is a further object of this invention to utilize volume control dampers to effect mixing of two dissimilar streams of air.

Another object of my invention is to provide means for preventing heat exchanger freeze-up in an air conditioning system delivering a combination of fresh and recirculated air.

Yet another object of my invention is to utilize damper vanes to effect proportioning and mixing of two streams of air wherein the dampers are so arranged to permit adjustment for proportional volume control without substantially diminishing their mixing function.

Still a further object of this invention is to provide a mixing chamber with damper assemblies which are automatically adjusted in response to outlet air temperatures and in which the damper assemblies serve to enhance the mixing of the air within the mixing chamber.

Other objects and advantages will become apparent as this specification proceeds to describe the invention with reference to the accompanying drawings in which:

FIGURE 5 is a front sectional view of the modification schematically illustrating the fluid flow pattern; and FIGURE 6 is a section taken at 6—6 of FIGURE 5 showing the damper relationships and further illustrating the fluid flow pattern.

Figure 1:
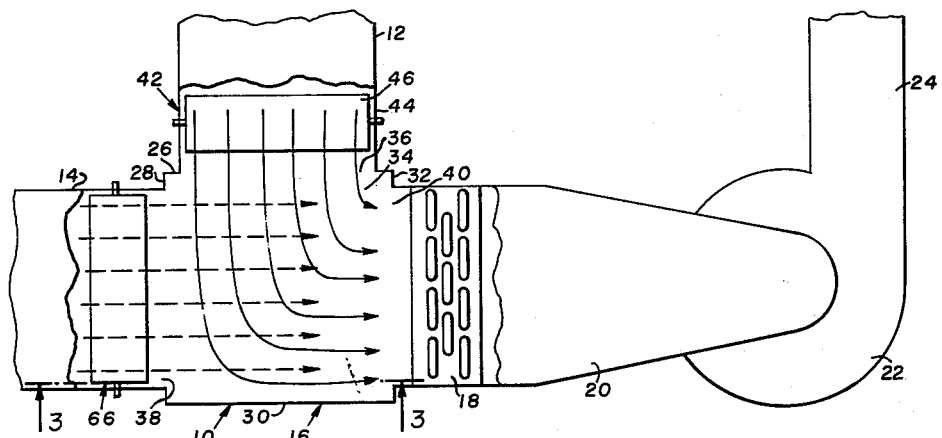
FIGURE 1 is a schematic illustration of a preferred embodiment of the invention as applied to an air conditioning system.

Referring to FIGURE 1, an air conditioning system 10 is illustrated in which is provided a return air conduit 12 and a fresh or outside air conduit 14 for delivering return and fresh air respectively to a mixing chamber 16. After thorough mixing of the return and fresh air the resulting mixture is passed through a heat exchange coil 18 in close proximity to the mixing chamber 16. The coil may be heated by a freezable fluid such as water which may take the form of hot water or steam. The air thus issuing from exchange coil 18 is delivered via conduit 20 to fan 22 and hence to the conditioned space (not shown) via conduit 24. As aforementioned conduit 12 returns a portion of the air from the conditioned space (not shown) for reconditioning.

Figure 2:
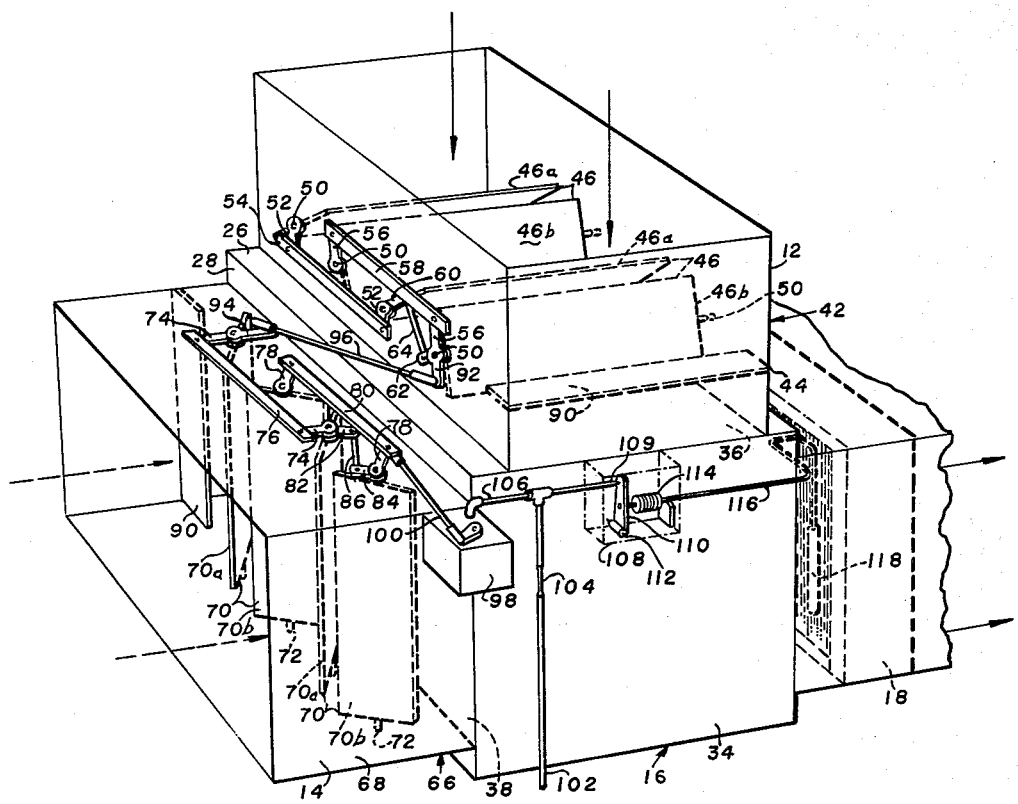
FIGURE 2 is a perspective view of the fluid proportioning and mixing device and heat exchange coil shown in FIGURE 1.
Figure 3:
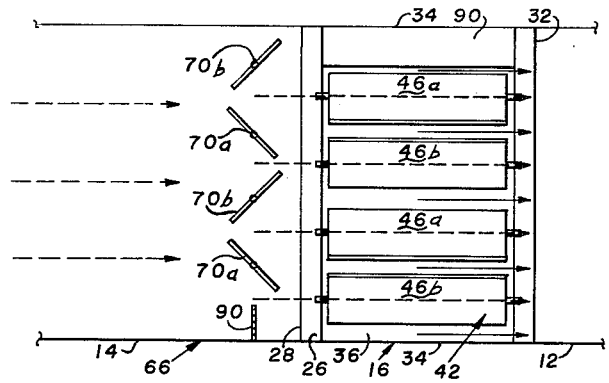
FIGURE 3 is a sectional view taken at 3—3 of FIGURE 1 illustrating the fluid flow pattern and damper relationships.

Now referring to FIGURES 1–3, it will be evident that mixing chamber 16 is comprised of a rectangular box-like structure having a first side wall 26, a second side wall 28, a third side wall 30, and a fourth side wall 32, and end walls 34. Side walls 26, 28, 30, and 32 are normal to a common plane such as that extending through an end wall 34.

Side walls 26, 28, and 32 are provided respectively with return inlet aperture 36, fresh air inlet aperture 38, and outlet aperture 40. Mounted adjacent inlet aperture 36 is a damper assembly 42 having a housing 44 connected to side wall 26. Housing 44 may be part of or an extension of conduit 12 if desired.

Disposed within housing 44 is arranged a row of damper vanes 46 each vane of which is mounted in housing 44 via members 50 for pivotal movement about an axis extending in parallel relationship with the above mentioned common plane. Each of the axes is equally spaced from and is parallel to the axis of the damper vane or vanes immediately adjacent thereto. Each alternate damper vane 46a is provided with a crank 52 attached to a mounting member 50 for pivotal movement therewith. The outer ends of cranks 52 are interconnected by link 54 for common pivotal movement of alternate damper vanes 46a. In a similar manner, alternate damper vanes 46b are provided with cranks 56 and interconnecting link 58 for common pivotal movement. Thus, the damper vanes within each set of alternate damper vanes pivot simultaneously in the same direction.

However, the two sets of alternate damper vanes are interconnected for opposite pivotal movement as by cranks 60 and 62 and interconnecting cross link 64. Crank 60 is mounted for pivotal movement with one of damper vanes 46a and crank 62 is mounted for pivotal movement with one of damper vanes 46b. The outer ends of cranks 60 and 62 are interconnected by cross link 64. Cranks 60 and 62 and cross link 64 are arranged to move the two sets of alternate damper vanes in opposite directions as is well known to those skilled in the art.

Air that is passed from conduit 12 through damper assembly 42 around vanes 46 to aperture 36 is stratified into narrow layers by vanes 46 as illustrated by the air flow pattern represented by the solid arrows in FIGURE 3. These air strata extend far into the mixing chamber 16 as illustrated in FIGURE 1. It will be noted that each air stratum extends in a plane parallel to the aforementioned common plane. Adjustment of damper assembly 42 for controlling the volume of the fluid stream passing inlet 36 will not appreciably change the disposition or relative spacing of these air strata.

A second damper assembly 66 is mounted adjacent inlet aperture 38 and is provided a housing 68 which may be part of or an extension of conduit 14 if desired. Disposed within housing 68 is arranged a row of damper vanes 70 each damper of which is mounted in housing 68 via members 72 for pivotal movement about an axis extending in parallel relationship with the aforementioned common plane. Each of the axes is equally spaced from and parallel to the axis of the damper vane or vanes immediately adjacent thereto. Each alternate damper 70a is provided with a crank 74 attached thereto via mounting member 72 for pivotal movement therewith. The outer ends of cranks 74 are interconnected by link 76 for common pivotal movement of alternate damper vanes 70a. In a similar manner alternate damper vanes 70b are provided with cranks 78 and interconnecting link 80 for common pivotal movement.

Just as in damper assembly 42 the sets of alternate damper vanes of assembly 66 are interconnected for opposite pivotal movement as by cranks 82 and 84 and interconnecting cross link 86. Crank 82 is mounted for pivotal movement with one of damper vanes 70a, and crank 84 is mounted for pivotal movement with one of damper vanes 70b. The outer ends of cranks 82 and 84 are interconnected by cross link 86. Cranks 82 and 84 are arranged to move the two sets of alternate damper vanes in opposite directions.

Air that is passed from conduit 14 through damper assembly 66 around vanes 70 to aperture 38 is also stratified into narrow layers by vanes 70 as illustrated by the air flow pattern represented by dashed arrows in FIGURE 3. These air strata also extend far into mixing chamber 16. It will again be noted that each such air stratum extends in a plane parallel to the aforementioned common plane. Adjustment of the damper assembly 66 for controlling the volume of the fluid stream passing therethrough will not change the disposition or relative spacing of these air strata.

It should be carefully noted as in FIGURE 3 that the air strata formed by each row of damper vanes are interposed by air strata formed by the other row of damper vanes. This interposition of air strata from each row is brought about by the staggered relationship of the two rows of damper vanes. Thus it will be noted that the axes of the damper vanes of one row are disposed midway between the axes of the other row as measured in a direction normal to said common plane. In order to prevent undue air flow around each row of vanes in that space resulting from this offset, a partition member 90 is arranged between the end of each row of vanes and its respective damper assembly housing.

In order to effect proportioning of the two streams of air passing through inlets 36 and 38 respectively, a proportioning mechanism is provided. This mechanism is comprised of a crank 92 mounted for pivotal movement with one of the damper vanes 46 of damper assembly 42 and a crank 94 mounted for pivotal movement with one of the damper vanes 70 of damper assembly 66. The outer ends of cranks 92 and 94 are interconnected as by proportioning link 96. Ball and socket joints, well known to the art, may be used to join cranks 92 and 94 to link 96. Cranks 92 and 94 are so arranged that movement of one damper assembly toward its open position effects movement of the other damper assembly toward its closed position.

The proportioning of the air streams may be governed by the temperature of the mixed air stream passing through outlet 40 at a point upstream of exchange coil 18. To accomplish this function I have provided a pneumatic pressure responsive motor 98 which is operatively connected to adjustably pivot one of the damper vanes of one of the damper assemblies as by connecting linkage 100 in any known manner.

Pneumatic pressure is supplied to pressure responsive motor 98 via pipe 102, restrictor 104 and pipe 106. The pressure in pipe 106 and thus motor 98 is controlled by restrictor 104 and bleed valve 108. Bleed valve 108 may have a bleed port 109 and a bleed port operator 110 pivoted at 112 for controlling the flow through bleed port 109. The position of bleed port operator 110 is controlled by expansible bellows 114 connected at one end to operator 110. The position of said one end of said bellows is changed in response to the fluid pressures within bellows 114. A capillary tube 116 provides fluid communication between the bellows 114 and temperature sensing bulb 118 which is filled with an expansible fluid in a manner well known to those skilled in the art. Bulb 118 may be placed adjacent mixing chamber outlet 40 if desired. Thus, a change in air temperature at outlet 40 will effect a change in the position of the damper vanes of each damper assembly. The damper control may further be arranged to close the fresh air damper when the conditioning system is not functioning.

It will thus be evident that the device I have provided is capable of mixing two streams of air in various proportions as determined by a condition such as temperature at the mixing chamber outlet. In addition the proportioning mechanism, i.e., damper assemblies 42 and 66, is so arranged as to stratify the two streams of air and combine the strata of each stream in such a manner that uniform distribution thereof takes place prior to intimate mixing. Thus, to avoid the problems associated with stratified air such as coil freeze-up, I have provided means for stratifying two streams of air and interposing the respective strata of each to obtain uniform distribution. Once properly distributed, the intermingling of the strata follows thereby providing efficient and intimate mixing with very little pressure drop.

Figure 4:
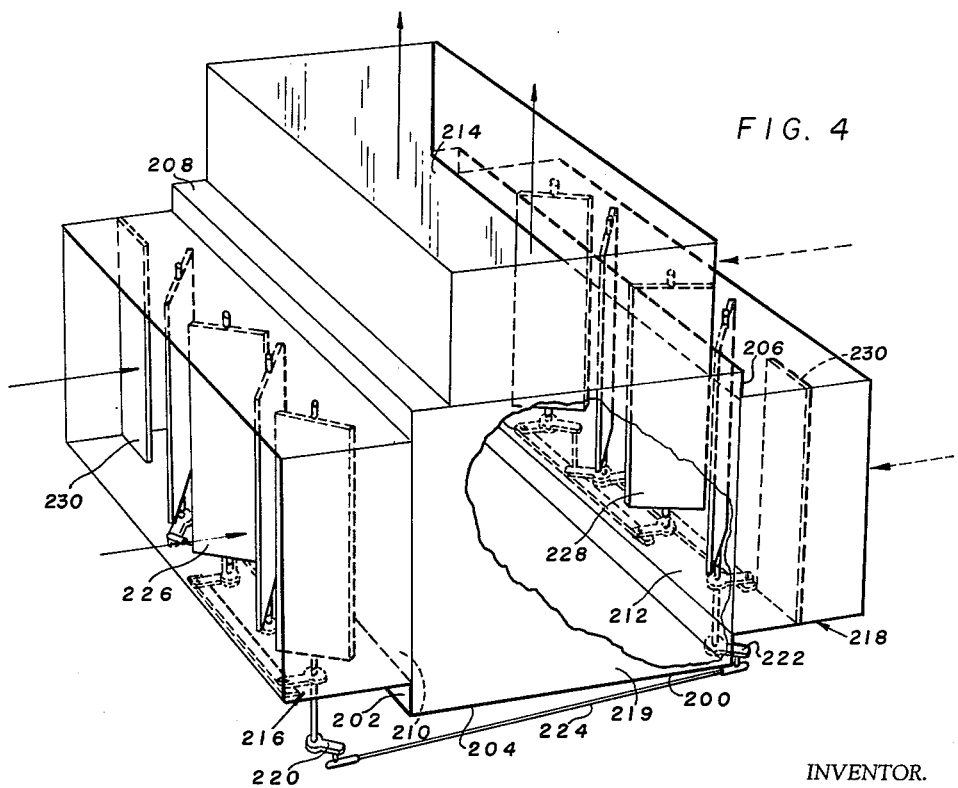
FIGURE 4 is a perspective view of a modified form of the fluid proportioning and mixing device wherein the fluid inlets are on opposite sides of the mixing chamber.

In FIGURES 4–6 a modified form of the air mixing device is shown in which the fluid inlets are in opposite sides of the mixing chamber. In the modified form a box-like mixing chamber 200 having side walls 202, 204, 206, and 208 is provided with inlet aperture 210 in side wall 202 and inlet aperture 212 in opposite side wall 206. An outlet aperture 214 is provided in side wall 208 for egress of air from the mixing chamber.

Mounted adjacent inlet aperture 210 is a damper assembly 216 similar in construction to that of damper assemblies 42 and 66 of the preferred embodiment. Mounted adjacent inlet 212 is a damper assembly 218, the construction of which is also similar to that of the damper assemblies of the preferred embodiment. Damper assemblies 216 and 218 are provided with a row of damper vanes 226 and 228 respectively, each damper vane of which is mounted for pivotal movement about an axis extending in parallel relationship with a common plane such as that passing through end wall 219. It will again be noted that the axes of the damper vanes of each row are equally spaced and parallel to each other. The axes of the damper vanes of one row are disposed midway between the axes of the other row as measured in a direction normal to said common plane.

As aforementioned, the effect of this offset arrangement is to cause the air strata from one damper assembly to be interposed between the air strata from the other assembly as illustrated in FIGURES 5 and 6. Partitions 230 may be arranged in each of the damper assemblies to prevent undue air flow around each row of damper vanes in the space resulting from this offset.

Crank 220 mounted for pivotal movement with one damper vane of damper assembly 216 and crank 222 mounted for pivotal movement with one damper vane of assembly 218 are interconnected at their outer ends by proportioning link 224. Cranks 220 and 222 are arranged in such a manner that the movement of a vane in one damper assembly toward the fully open position effects movement of the vanes in the other damper assembly toward the fully closed position. The damper assemblies may be controlled in response to outlet temperature if desired such as by the temperature responsive pneumatic control shown in FIGURE 3.

It will thus be seen that in both the embodiments of the invention, the damper assemblies may function to proportion the air flow through the several inlets in response to temperature conditions at the outlet. By the particular inventive construction and arrangement of these damper assemblies, the distribution and mixing of the several air streams can be greatly improved. Since mixing chambers are often provided with some form of inlet damper means, the improved mixing in the inventive device is realized at little or no extra cost. Such additional mixing is instrumental in preventing heat exchange coil freeze-ups.

While I have disclosed only two forms of my invention it is realized that many modifications could be made therein. Thus, either one or both of the dampers may be of the fixed type. In such a case the damper vanes may be simply constructed as fixed louvers arranged to permit interposition of the fluid strata from each. If desired, more than two fluid streams could be combined in this manner; and each row of damper vanes may be placed either within or without the mixing chamber and the partitions associated therewith could be constructed as part of the mixing chamber side wall or entirely eliminated as by reducing the width of the damper assembly housing.

Although I have described in detail the preferred embodiment of my invention and one alternative and suggested several modifications, I contemplate that many other changes may be made without departing from the scope or spirit of my invention, and I desire to be limited only by the claims.

I claim:

1. A fluid mixing device for mixing a plurality of fluid streams comprising: means forming a fluid mixing chamber; first inlet means forming a first fluid inlet to said fluid mixing chamber; second fluid inlet means forming a second fluid inlet to said fluid mixing chamber; means forming a fluid outlet from said fluid mixing chamber; a first damper assembly disposed adjacent said first inlet means; a second damper assembly disposed adjacent said second inlet means; said first damper assembly being comprised of a first group of pivotally adjustable elongated damper vanes each vane of which is mounted for pivotal movement about a pivot axis; said vanes being so arranged that the pivot axes thereof are substantially parallel to each other and extend in substantially parallel relationship with a common plane; said second damper assembly being comprised of a second group of pivotally adjustable elongated damper vanes each vane of which is mounted for pivotal movement about a pivot axis; said vanes of said second group being so arranged that the pivot axes thereof are substantially parallel to each other and extend in substantially parallel relationship with said common plane; said common plane being substantially parallel to the flow of fluid layers from both of said first and second damper assemblies; the vanes of said second group of vanes being so arranged that the longitudinal axes of the vanes thereof are interposed between the longitudinal axes of the vanes of said first group as measured in a direction normal to said common plane, and means for operatively interconnecting alternate vanes of at least one of said groups of pivotally adjustable elongated damper vanes for opposite pivotal movement.

2. A fluid mixing device as defined in claim 1 further including fan means; means for providing fluid communication between said fluid outlet and said fan means, and a heat exchange coil disposed within said last mentioned means between said outlet and said fan means.

3. A fluid mixing device as defined in claim 1 wherein said fluid inlets are normal to each other.

4. A fluid mixing device as defined in claim 1 wherein said mixing chamber is substantially rectangular and said fluid inlets are arranged on opposite sides of said mixing chamber.

5. A fluid mixing device as defined in claim 1 including means operatively interconnecting said adjustable damper assemblies for opposite movement whereby the proportion of fluid from each inlet may be adjusted.

6. A device as defined by claim 5 wherein means is provided for adjusting one of said damper assemblies in response to temperature conditions adjacent said outlet.

7. The device as defined by claim 1 wherein the vanes of at least one of said groups of vanes are arranged in a row and the pivot axes thereof are fixed in substantially coplanar relationship.

8. The device as defined by claim 7 wherein a partition member is disposed at one end of said row of vanes and extends in the direction of the plane of the axes of said one group of vanes at least a distance equal to about one-half the distance between said axes.

9. A fluid mixing device for mixing a plurality of fluid streams of different qualities comprising means forming a fluid mixing chamber; means for stratifying a first fluid from one of said streams and directing the flow of stratified first fluid issuing therefrom into said mixing chamber in a first direction parallel to the strata thereof; means for stratifying a second fluid from another of said streams into strata extending parallel to and offset from the strata of said first fluid and for directing the flow of stratified second fluid issuing therefrom into said mixing chamber in a direction toward the first mentioned strata and parallel to the last mentioned strata whereby the strata of said first and second fluids are interleaved and thoroughly mixed, at least one of said stratifying means comprising a plurality of adjustable damper vanes.

10. A fluid mixing device for mixing a plurality of fluid streams of different qualities comprising: means forming a fluid mixing chamber; said mixing chamber being provided with a first and second fluid inlet and a fluid outlet; first conduit means connected to said first fluid inlet adapted to direct a first fluid stream to said first fluid inlet; second conduit means connected to said second fluid inlet adapted to direct a second fluid stream to said second fluid inlet; third conduit means connected to said fluid outlet adapted to direct a third fluid stream from said fluid outlet; each of said conduit means being arranged to conduct its respective fluid stream proximate said mixing chamber in a direction substantially parallel to a common plane; first stratifying means disposed adjacent said first fluid inlet adapted to stratify said first fluid stream into spaced fluid layers extending into said fluid mixing chamber in substantially parallel relationship with said common plane; second stratifying means disposed adjacent said second fluid inlet adapted to stratify said second fluid stream into spaced fluid layers extending into said fluid mixing chamber in substantially parellel relationship with said common plane; means positioning said second stratifying means with respect to said first stratifying means for delivery of the fluid layers of said second stratifying means between the layers of said first fluid stream in said fluid mixing chamber for thorough distribution prior to egress of the resulting fluid mixture through said fluid outlet; and wherein at least one of said stratifying means is an adjustable damper assembly having a plurality of damper vanes each of which is mounted for pivotal movement about an axis extending in substantially parallel relationship with said common plane.

11. A fluid mixing device for mixing a plurality of fluid streams of different qualities comprising: means forming a fluid mixing chamber; said mixing chamber being provided with a first and second fluid inlet and a fluid outlet; first conduit means connected to said first fluid inlet adapted to direct a first fluid stream to said first fluid inlet; second conduit means connected to said second fluid inlet adapted to direct a second fluid stream to said second fluid inlet; third conduit means connected to said fluid outlet adapted to direct a third fluid stream from said fluid outlet; each of said conduit means being arranged to conduct its respective fluid stream proximate said mixing chamber in a direction substantially parallel to a common plane; first stratifying means disposed adjacent said first fluid inlet adapted to stratify said first fluid stream into spaced fluid layers extending into said fluid mixing chamber in substantially parallel relationship with said common plane; second stratifying means disposed adjacent said second fluid inlet adapted to stratify said second fluid stream into spaced fluid layers extending into said fluid mixing chamber in substantially parallel relationship with said common plane; means positioning said second stratifying means with respect to said first stratifying means for delivery of the fluid layers of said second stratifying means between the layers of said first fluid stream in said fluid mixing chamber for thorough distribution prior to egress of the resulting fluid mixture through said fluid outlet; and wherein said third fluid conduit means is connected to a fan means; and a heat exchange coil is disposed within said third conduit means between said fan means and said fluid outlet of said mixing chamber.

12. A device for mixing two fluid streams of different qualities comprising means forming a mixing chamber; first means for adjustably restricting and stratifying fluid from one of said fluid streams into a plurality of substantially parallel first fluid layers extending therefrom in said mixing chamber; second means for stratifying fluid from the other of said fluid streams into a plurality of second fluid layers extending therefrom in substantially parallel interleaved relation with said first fluid layers; and means for discharging fluid from said mixing chamber; said first means comprising a plurality of pivotally adjustable elongated damper vanes, the pivotal axes of which extend in parallel relation with said second fluid layers.

13. A device for mixing two fluid streams of different qualities comprising means forming a mixing chamber; first means for stratifying fluid from one of said fluid streams into a plurality of substantially parallel first fluid layers extending therefrom in said mixing chamber; second means for stratifying fluid from the other of said fluid streams into a plurality of second fluid layers extending therefrom in substantially parallel interleaved relation with said first fluid layers; and means for discharging fluid from said mixing chamber; said first means comprising a plurality of opposed damper vanes.

References Cited by the Examiner

UNITED STATES PATENTS

| | | | |
|---|---|---|---|
| 1,913,980 | 6/33 | Fisher | 126—90 |
| 1,994,443 | 3/35 | Bailey | 110—28 |
| 1,994,446 | 3/35 | Hardgrove | 110—28 |
| 2,040,893 | 5/36 | Young | 189—62 X |
| 2,226,815 | 12/40 | Haines | 236—49 |
| 2,255,735 | 9/41 | McGrath | 98—38 X |
| 2,787,946 | 4/57 | Gannon | 98—38 |
| 3,049,985 | 8/62 | Klingberg | 98—41 X |

ROBERT A. O'LEARY, *Primary Examiner.*

CHARLES SUKALO, *Examiner.*